United States Patent Office   2,992,492
Patented July 18, 1961

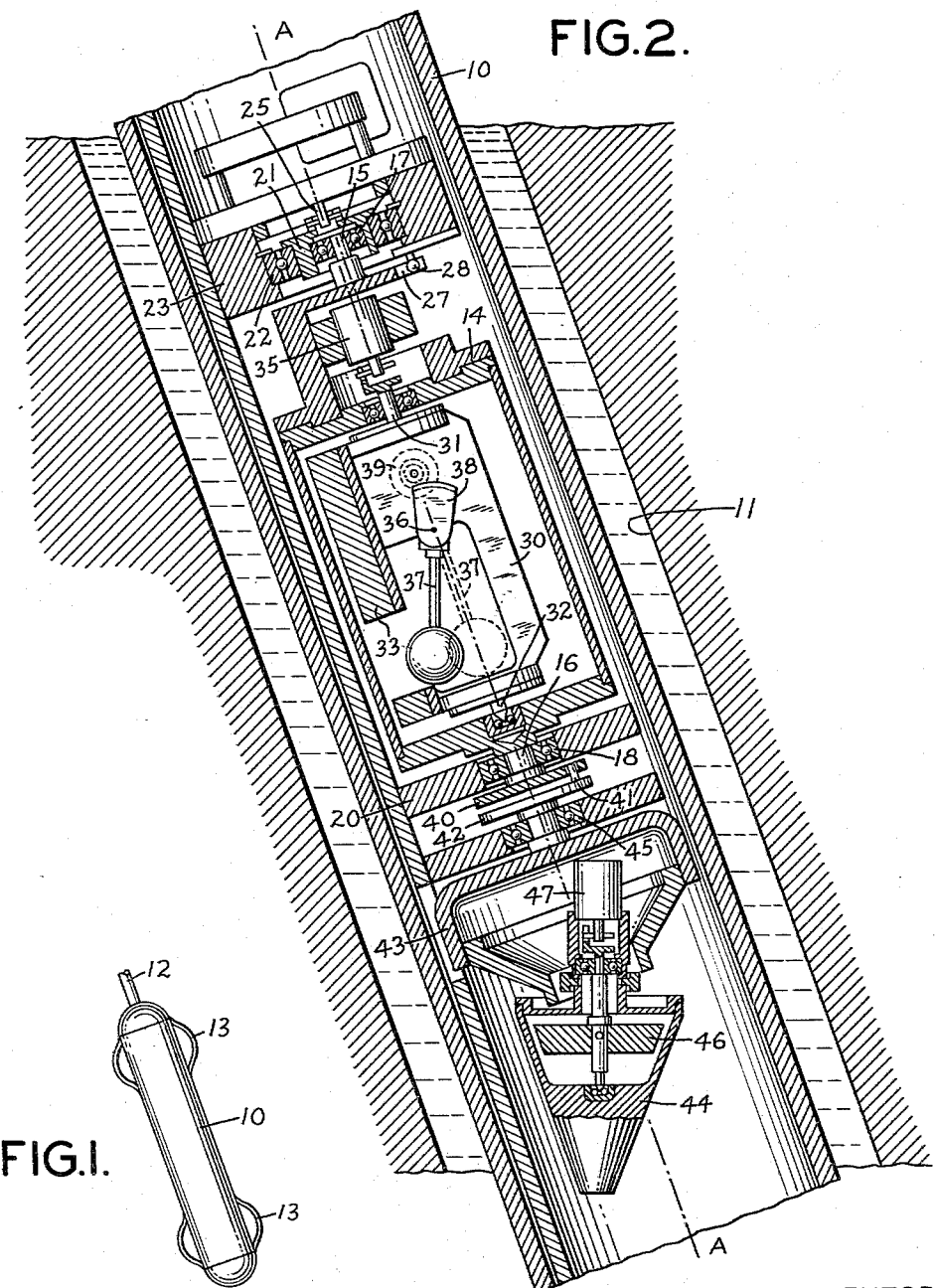

2,992,492
BORE HOLE INCLINOMETER APPARATUS
René Raoul Roussin, Marnes-la Coquette, France, assignor to Société de Prospection Electrique, Procédés Schlumberger, Paris, France, a corporation of France
Filed Dec. 24, 1957, Ser. No. 704,937
Claims priority, application France Dec. 26, 1956
4 Claims. (Cl. 33—205)

The present invention relates to apparatus for measuring and recording as a function of depth the deflection of sounding wells or bore holes with respect to the vertical, and, more particularly, to novel and improved apparatus for providing indications at each measuring point as to the angle between the axis of the bore hole and a vertical line, and the azimuth of the vertical plane containing the axis of the bore hole with reference to a geographical direction in a manner such that it may be possible to ascertain accurately through measurements executed throughout the length of the bore hole, the location of the latter inside the earth.

It has already been proposed, in particular in the U.S. Patent No. 2,746,162, to provide apparatus of this type wherein the azimuth of the vertical plane passing through the bore hole with reference to a geographical direction is measure through the agency of a compass or a magnetic bar which is constantly subjected to small percussions or vibrations, for example by means of a power unit actuating an eccentric member. In that patent, the arrangement for measuring the deflection of the axis of the sounding well or bore hole with reference to a vertical line includes a pivotal element adapted to pivot about an axis of the apparatus which is caused to remain constantly parallel to the axis of the bore hole. The pivotal element carries an eccentric weight which constantly assumes a position in a vertical plane passing through the axis of the bore hole or parallel therewith while a pendular system adapted to move in the vertical plane containing the eccentric weight facilitates measuring the deflection of the axis of the bore hole with reference to the vertical. The angles formed respectively by the magnetic bar or compass with respect to a geographical direction and the pendular system with respect to the vertical, which respectively correspond to the azimuth of the deflection and to the actual deflection angle, are transmitted in the form of electrical signals to suitable measuring instruments at the earth's surface.

It is an object of the invention to provide novel and improved apparatus of the above type, and, in particular, to provide a greater accuracy in the measurement of the angle between the axis of the bore hole and the vertical. It has been found that as a consequence of the friction exerted on the axis of the pendular arrangement, it does not always assume a truly vertical position. Therefore, it has been found desirable to give the pendulum carrier a reciprocating rotary movement so as to replace the static friction coefficient between the pendulum and its support by a dynamic friction coefficient. For example, the pivotal element carrying the eccentric weight, and which provides the pivotal axis of the pendular arrangement, may be given a tacking or veering movement of slight amplitude. Furthermore, this movement may also be transmitted, in accordance with the invention, to the member carrying the magnetic bar or the compass, in order to apply to the magnetic bar or the compass suitable vibrations in the manner described in the aforementioned patent.

For further objects and a more detailed understanding of the present invention, reference may be had to the following description taken in conjunction with the accompanying figures of the drawing, in which:

FIGURE 1 is a longitudinal view in side elevation of a bore hole inclinometer apparatus, in accordance with the invention; and FIG. 2 is a more detailed view of the inclinometer apparatus of FIG. 1 in longitudinal cross-section illustrating an exemplary form of apparatus for executing measurements of the type referred to, in accordance with the principles of the invention.

The inclinometer apparatus comprises an outer elongated cylindrical casing 10 adapted to be lowered into a bore hole 11 for measuring the deflection thereof. The cylindrical casing 10 is suspended from a conventional electrical cable 12, as shown in FIG. 1, which contains the different electrical leads feeding electrical signals representative of the different measured angles to the surface of the earth for use by suitable measuring and recording instruments, in the manner shown, for example, in the aforementioned U.S. Patent No. 2,746,162. The casing 10 is provided with laterally extending, exterior centering devices 13 for centering the casing inside the bore hole in a manner such that the longitudinal axis A—A of the apparatus registers substantially for all practical purposes with the axis of the bore hole in the section of the latter in which the apparatus is located, whereby it is sufficient to measure the angles between the axis of the apparatus and the different geographical axes to obtain the desired measurements.

Inside the casing 10 is rotatably mounted a cage 14 by means of pivots 15 and 16 carried at its upper and lower ends, respectively, and fitted inside spherical ball bearing mountings 17 and 18, respectively. The outer raceway of the ball bearing mounting 18 is centered upon the axis of the apparatus and is fitted inside a transverse supporting wall 20 forming part of the apparatus. The ball bearing mounting 17, on the other hand, is fitted eccentrically within a hub 21 adapted to revolve inside an outer ball bearing mounting 22 carried by a transverse supporting wall 23 secured to the upper end of the casing of the apparatus. The ball bearing mounting 22 is positioned coaxially with the axis A—A of the apparatus. The hub 21 is fixedly engaged by a shaft 25 driven in rotation by a suitable motor and drive mechanism (not shown), which may be energized from the earth's surface through electric leads incorporated in the supporting cable 12.

By reason of its eccentricity, the upper end of the pivot 15 is subjected to a rotary movement and the axis defined by the pivots 15 and 16 describes a cone about the axis A—A of the apparatus, the apical half-angle of this cone being very small, for example, on the order of less than 1°. Furthermore, one of the transverse sides of the cage 14 is provided with a rectilinear slot 27 directed toward the axis of the cage 14, i.e., the axis defined by the pivots 15 and 16. The slot 27 is engaged by a knob 28 carried by the transverse wall 23 so that when the motor drives the shaft 25 the axis of the cage assumes, as mentioned hereinabove, a rotary movement, and the cage 14, considered as a whole, assumes a veering movement corresponding substantially to the superposition of an oscillating movement, the amplitude of which is equal to about 2° about an axis perpendicular to the plane of the drawing and passing through the center of the pivot 16, on a rocking movement about the axis defined by the pivots 15 and 16. Inside the cage 14, there is disposed a member 30 carried by two pivot means 31 and 32 adapted to swivel inside the transverse ends of the cage 14. The member 30 includes an eccentric weight 33, so that whatever may be the angle of inclination of the common axis defined by the pivot means 31 and 32, the plane defined by the eccentric weight and the pivotal axis has a general tendency to remain vertical. The angular position assumed by the eccentric weight with reference to a point on the casing 10 and in particular with reference to points defined by the suspension of the compass as described hereinafter is supplied to the earth's surface by electrical signals obtained from a potentiometric device 35.

A spindle 36 extends perpendicularly to the vertical plane passing through the eccentric weight 33, and a pendulum 37 is adapted to rock about the spindle 36 to facilitate the indication and measurement of the deflection with reference to the vertical of the axis of the apparatus and consequently of the bore hole. The pendulum 37 is rigid with a contact making arm 38 cooperating with an electric potentiometric device 39, which is fixedly mounted with reference to the body of the apparatus, so as to provide electrical signals which may be transmitted to the surface of the earth and which have a value representative of the angle of deflection between the axis of the bore hole, viz, the apparatus, and the vertical.

From the above, it will be understood that the veering movement of the cage 14 will produce a corresponding veering movement of the spindle 36 carrying the pendulum 37 so that the latter has a tendency to assume a slight rocking movement about the spindle 36. Consequently, the frictional coefficient of the pendulum about its spindle is a dynamic coefficient and the pendulum has, therefore, a tendency to rock about a direction which is very nearly vertical without any risk of its being driven in a different direction as a consequence of the friction exerted on its spindle.

It should also be noted that the pivot means 15 and 16 of the cage 14 are subjected in practice to a reciprocating movement of a very small amplitude. This reciprocating movement may, in accordance with the invention, be utilized to give the compass or the magnetic bar the desired vibratory movement. To this end, the pivot means 16 extends beneath the transverse support plate 20 and is in fixed relation with a transverse plate 40. The plate 40 is in driving relation by means of a pin 41 with a coaxially mounted, parallel plate 42. A support 43 for the compass 44 is connected through a ball bearing means 45 to the plate 42 to be driven thereby. Movement of a magnetic bar 46 is translated into electrical signals in a conventional manner by suitable potentiometric means 47 for transmission to the earth's surface, the electrical signals being representative of the value of the angle of deflection between the compass needle and the body of the apparatus, i.e., the azimuth of the vertical plane containing the axis of the bore hole with reference to a geographical direction. Since the support 43 of the compass 44 is subjected, under the action of the plate 42, to an oscillatory movement about its axis, a reduction in the coefficient of friction of the needle about its axis is accomplished.

Thus there has been provided novel and improved apparatus for achieving a greater accuracy in the measurement of the angle between the axis of the bore hole and a vertical line in a bore hole inclinometer apparatus.

It will be understood by those skilled in the art that the above described embodiment is meant to be merely exemplary and that it is susceptible of modification and variation within the spirit and scope of the invention. Therefore, the applicant's invention is not deemed to be limited except as defined in the appended claims.

I claim:

1. In an apparatus for determining the angular deviation of the longitudinal axis of a bore hole from the vertical, the combination comprising an elongated casing adapted to be passed through the bore hole and to have the longitudinal axis thereof maintained in substantially fixed relation to said longitudinal axis of the bore hole, a cage having a longitudinal axis and being movably mounted on said casing in such manner that it is adapted to be moved in a rocking motion inside said casing about said longitudinal axis of said casing, means for controlling the rocking movement of said cage about said longitudinal axis of said casing, a member mounted on said cage and adapted for pivotal movement in said casing about an axis having the same direction as said longitudinal axis of said cage, an eccentric weight carried by said member, a spindle mounted on said member in said cage perpendicular to the axis thereof, a pendulum pivotally secured inside said cage about said spindle for swinging movement in a plane including said eccentric weight and said longitudinal axis of said cage, and adjustable means controlled by said pendulum for indicating the angular position of said pendulum relative to a reference position.

2. In an apparatus for determining the angular deviation of the longitudinal axis of a bore hole from the vertical, the combination comprising an elongated casing adapted to be passed through the bore hole and to have the longitudinal axis thereof maintained in substantially fixed relation to said longitudinal axis of the bore hole, a cage having a longitudinal axis and being pivotally mounted on said casing, means for providing a rocking movement of said cage inside said casing about said longitudinal axis of said casing, a member mounted on said cage and adapted for pivotal movement in said casing about an axis having the same direction as said longitudinal axis of said cage, an eccentric weight carried by said member, a spindle mounted on said member in said cage perpendicular to the axis thereof, a pendulum pivotally secured inside said cage about said spindle for swinging movement in a plane including said eccentric weight and said longitudinal axis of said cage, and adjustable means controlled by said pendulum for indicating the angular position of said pendulum relative to a reference position.

3. An apparatus as claimed in claim 2, wherein said pivotally mounted cage has two longitudinally opposed pivots, and said rocking movement providing means comprises means for providing revolving movement of one of said pivots in a plane perpendicular to the longitudinal axis of said casing, and means for modifying the movement of said cage in response to the revolving movement of said one pivot to provide a resultant rocking movement of said cage inside said casing about said longitudinal axis of the casing.

4. In an apparatus for determining the angular deviation of the longitudinal axis of a bore hole from the vertical, the combination comprising an elongated casing adapted to be passed through the bore hole and to have the longitudinal axis thereof maintained in substantially fixed relation to said longitudinal axis of the bore hole, a cage having a longitudinal axis and being mounted on said casing in such a manner that it is adapted to be moved in a rocking motion inside said casing about said longitudinal axis of said casing, means for controlling the rocking movement of said cage about said longitudinal axis of said casing, a member mounted on said cage and adapted for pivotal movement in said casing about an axis having the same direction as said longitudinal axis of said cage, an eccentric weight carried by said member, a spindle mounted on said member in said cage perpendicular to the axis thereof, a pendulum pivotally secured inside said cage about said spindle for swinging movement in a plane including said eccentric weight and said longitudinal axis of said cage, adjustable means controlled by said pendulum for indicating the angular position of said pendulum relative to a reference position, a magnetic element, a support for said magnetic element positioned substantially coaxial with said longitudinal axis of said cage and coupled therewith and adapted to transmit the rocking movement of said cage to said magnetic element to shift said magnetic element slightly from its position of equilibrium, and means coupled to said magnetic element and said support for electrically transmitting the value of the angular position of the magnetic element in space.

References Cited in the file of this patent

UNITED STATES PATENTS

| | | |
|---|---|---|
| 1,452,485 | Tanner | Apr. 17, 1923 |
| 2,746,162 | Picard | May 22, 1956 |

UNITED STATES PATENT OFFICE

CERTIFICATE OF CORRECTION

Patent No. 2,992,492                                                    July 18, 1961

René Raoul Roussin

It is hereby certified that error appears in the above numbered patent requiring correction and that the said Letters Patent should read as corrected below.

Column 1, line 26, for "measure" read -- measured --; column 6, line 1, for "value" read -- values --.

Signed and sealed this 5th day of December 1961.

(SEAL)
Attest:

ERNEST W. SWIDER                                      DAVID L. LADD
Attesting Officer                                           Commissioner of Patents
                                                                                      USCOMM-DC